(Model.)
D. HENDERSON.
ANIMAL TRAP.
No. 392,674. Patented Nov. 13, 1888.
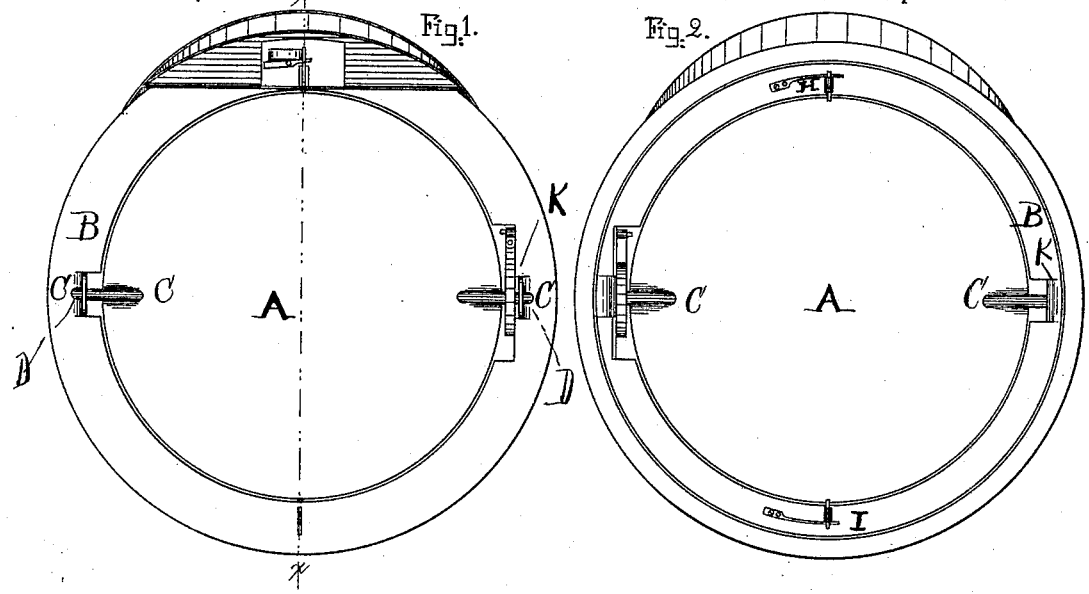
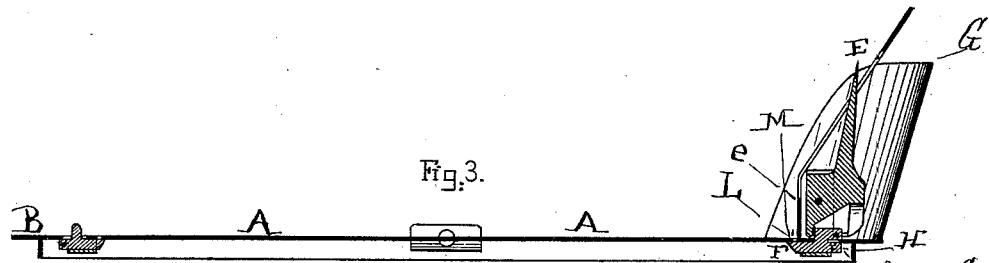
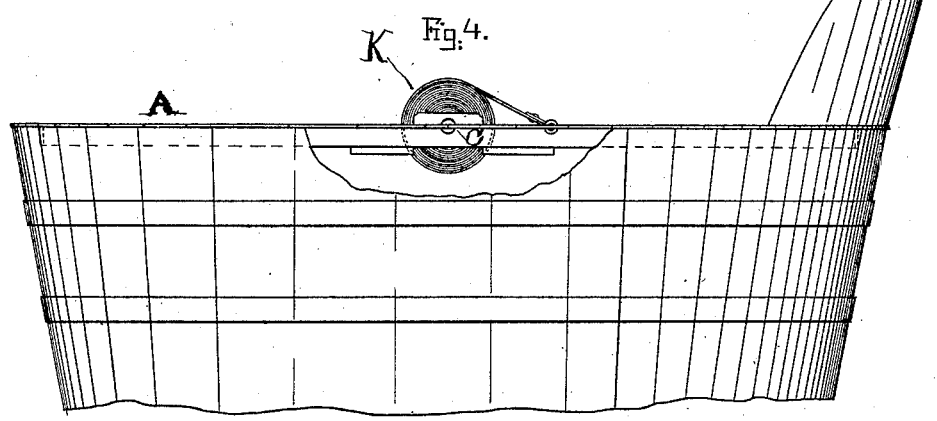
Witnesses.
Forrest Simmons,
Jam? W. S. Howard.
Inventor
David Henderson.
by his Attorney
Chas. R. Abell.

UNITED STATES PATENT OFFICE.

DAVID HENDERSON, OF BROCKTON, MASSACHUSETTS.

ANIMAL-TRAP.

SPECIFICATION forming part of Letters Patent No. 392,674, dated November 13, 1888.

Application filed June 16, 1888. Serial No. 277,393. (Model.)

*To all whom it may concern:*

Be it known that I, DAVID HENDERSON, a citizen of the United States, residing at Brockton, in the county of Plymouth and State of Massachusetts, have invented a new and useful Rat and Animal Trap, of which the following is a specification, reference being had to the accompanying drawings, in which—

Figure 1 is a top view showing the shield. Fig. 2 is a reversed view showing the under side of the trap. Fig. 3 is a side view showing the operation of the latches and springs securing the cover. Fig. 4 shows the attachment of the spring to the rim.

Similar letters refer to similar parts throughout the several views.

My invention can be placed on a tub, pail, box, firkin, or to anything which will serve for a receptacle for the rats or other animals when caught and prevent them from escaping. It could also be placed over a hole or pit in the ground, the chief requisite being that the receptacle employed shall perfectly secure the animal after the operation of the trap.

In the drawings my invention is represented by a securely-fitting cover designed to be placed over a firkin.

A is the disk surrounded by a frame, B, with which it is connected at the journaling of the ends of the axis C C at the points D D.

E is a spring-actuated trigger, on which the bait is placed, engaging with a spring-bolt, F, Fig. 3, as shown in drawings.

G is a bait-guard behind the trigger E, and is intended to prevent the rat or other animal from stealing the bait without springing the trap, and compels him to approach the bait on trigger E over the disk A.

In the rear of the spring-bolt F is a slot, *g*, through which passes a spring, H, attached as shown in drawings, Fig. 3. This spring H must be sufficiently elastic to return spring-bolt F to its proper and former place after the springing of the trap, to be hereinafter described.

I, Fig. 2, is a latch employed to prevent the dropping of the disk A while the trap is set. The spring-actuated bait-trigger E is pivoted at *c*. K, Figs. 1, 2, and 4, is a spiral spring attached to the frame B at one end and at the other to one end of the axis C.

The disk and frame should be securely attached by screws or in some efficient way to the firkin or other receptacle, which should also have a sufficient quantity of water—say one-third full—in which to have the rat or other animal fall.

I will now describe the operation of my invention.

The trap must be set by revolving the disk A toward the spring-actuated bait-trigger E. This tightens the spring K, the trigger E meanwhile being pressed forward, and thus drawing back the spring-bolt F, so as to allow the disk to revolve within the frame until the winding has become sufficient to give the disk the necessary force to operate. By releasing the trigger it resumes its usual position, and at the same time the spring-bolt F is pushed forward by the spring H and the disk A, actuated by spring K, makes a partial revolution. One of its edges coming in contact with the spring-bolt F presses it back until it passes the point lettered L, when pressure on the spring H being relieved it again pushes the spring-bolt F forward, which is then under the edge of the disk A, which falls naturally into the recess M. The effort of the disk A, actuated by the spring K, to continue its rotation is now arrested by the latch I, which has sprung out after the edge of the disk has passed it. The trap is now set and ready for use. The rat or other animal attracted by the bait upon the spring-actuated bait-trigger E approaches it over the disk A and commences to feed upon it, and in so doing causes a slight movement of the same, which is at once communicated to spring-bolt piece F, which is withdrawn from under the disk A, and the spring K, having all resistance to it removed, instantly causes a complete revolution of disk A. The rat or other animal can get to the bait only by standing on the disk A, and thus when the spring K operates is dropped into the firkin or other receptacle beneath and the cover automatically resumes its former position, and the trap is again ready to operate, and will continue to do so as long as the requisite force remains in the spring K.

The method of the rewinding of the same has been already described.

I am aware that prior to my invention springs and triggers have been employed in traps. I therefore do not broadly claim novelty in using these; but What I do claim as my invention, and desire to secure by Letters Patent, is—

In an animal-trap, the combination of a frame having a disk pivoted therein, a coiled spring secured to said frame and to the pivots for rotating the disk, a spring-actuated bait-trigger secured to one side of the frame, a bait-guard located on both sides of said trigger and having an opening on its inner side, through which the bait is accessible, and a spring-bolt secured on the under side of the frame to arrest the movement of the disk when one revolution thereof shall have been made, substantially as described.

In testimony whereof I affix my signature in presence of two witnesses.

DAVID HENDERSON.

Witnesses:
   J. R. PERKINS,
   FRED O. DAVIS.